(12) United States Patent  (10) Patent No.: US 8,441,741 B2
Yagi                       (45) Date of Patent:     May 14, 2013

(54) IMAGE PICKUP APPARATUS THAT DRIVES PLURAL LENS UNITS USING MOTORS DIFFERENT FROM EACH OTHER AND DRIVE CONTROL METHOD OF LENS

(75) Inventor: Hisao Yagi, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/193,164

(22) Filed: Jul. 28, 2011

(65) Prior Publication Data

US 2012/0033309 A1  Feb. 9, 2012

(30) Foreign Application Priority Data

Aug. 6, 2010 (JP) ................. 2010-176912

(51) Int. Cl.
*G02B 15/14* (2006.01)
*G02B 7/02* (2006.01)

(52) U.S. Cl.
USPC ........... 359/696; 359/694; 359/697; 359/822

(58) Field of Classification Search .......... 359/694–704, 359/811–830
See application file for complete search history.

(56) References Cited

U.S. PATENT DOCUMENTS

| 5,600,371 A * | 2/1997 | Arai et al. ...................... 348/335 |
| 6,445,416 B1 * | 9/2002 | Kyuma et al. ............... 348/240.3 |
| 7,499,227 B2 * | 3/2009 | Nurishi .......................... 359/698 |
| 7,697,218 B2 * | 4/2010 | Ishikawa et al. ............... 359/697 |

FOREIGN PATENT DOCUMENTS

JP        10-239580        9/1998

* cited by examiner

*Primary Examiner* — Mohammed Hasan
(74) *Attorney, Agent, or Firm* — Cowan, Liebowitz & Latman, P.C.

(57) ABSTRACT

An image pickup apparatus includes a first drive unit, a first lens unit configured to be driven by the first drive unit to perform a magnification-varying operation, a second drive unit, a second lens unit configured to be driven by the second drive unit, and a controller configured to control the first drive unit and the second drive unit so as to drive the second lens unit with reference to a position of the first lens unit in performing the magnification-varying operation. The controller controls the second lens unit so as to move only in a first direction in performing the magnification-varying operation.

6 Claims, 7 Drawing Sheets

IMAGE PICKUP APPARATUS THAT DRIVES PLURAL LENS UNITS USING MOTORS DIFFERENT FROM EACH OTHER AND DRIVE CONTROL METHOD OF LENS

BACKGROUND OF THE INVENTION

1. Field of the Invention

The present invention relates to an image pickup apparatus that drives a plurality of lens units using motors different from each other.

2. Description of the Related Art

Previously, an image pickup apparatus that drives a plurality of lens units using motors different from each other in performing a magnification-varying operation has been known. When the plurality of lens units are driven by the motors different from each other, the lens units are synchronously tracked so that each lens unit is located at a desired position in order to obtain a desired magnification or focal point. For example, Japanese Patent Laid-Open No. H10-239580 discloses a camera that performs a drive control of a zoom lens unit and a focus lens unit using motors different from each other. In this camera, the focus lens unit is driven in accordance with the movement of the zoom lens unit.

However, in a case where the plurality of lens units are tracked, the delay of a backlash or the noise of a gear at the time of inversion is generated when a drive direction of the tracked lens unit is inverted. In particular, while a moving image is taken, a sound of an object as well as an image is also recorded. Therefore, when the noise of the gear is generated by the inversion of the lens unit in performing a magnification-varying operation, the noise is recorded in a moving image file.

SUMMARY OF THE INVENTION

The present invention provides an image pickup apparatus capable of driving a lens suitable for a moving image in the image pickup apparatus that controls a plurality of lens units using motors different from each other.

An image pickup apparatus as one aspect of the present invention includes a first drive unit, a first lens unit configured to be driven by the first drive unit to perform a magnification-varying operation, a second drive unit, a second lens unit configured to be driven by the second drive unit, and a controller configured to control the first drive unit and the second drive unit so as to drive the second lens unit with reference to a position of the first lens unit in performing the magnification-varying operation. The controller controls the second lens unit so as to move only in a first direction in performing the magnification-varying operation.

A drive control method of a lens as another aspect of the present invention is a drive control method that drives a first lens unit using a first drive unit and that drives a second lens unit using a second drive unit to perform a magnification-varying operation. The drive control method including the steps of obtaining a position of a first lens unit at a first time, calculating a position of the first lens unit at a second time after a control cycle is passed from the first time and a position of the first lens unit at a third time after the control cycle is passed from the second time, calculating a position of the second lens unit at the second time and a position of the second lens unit at the third time, determining whether or not a moving direction of the second lens unit is inversed from a first direction to a second direction, and performing a correction processing so as to maintain the moving direction of the second lens unit in the first direction when the moving direction is determined to be inversed from the first direction to the second direction.

Further features and aspects of the present invention will become apparent from the following description of exemplary embodiments with reference to the attached drawings.

DESCRIPTION OF THE PREFERRED EMBODIMENTS

Figure 1:
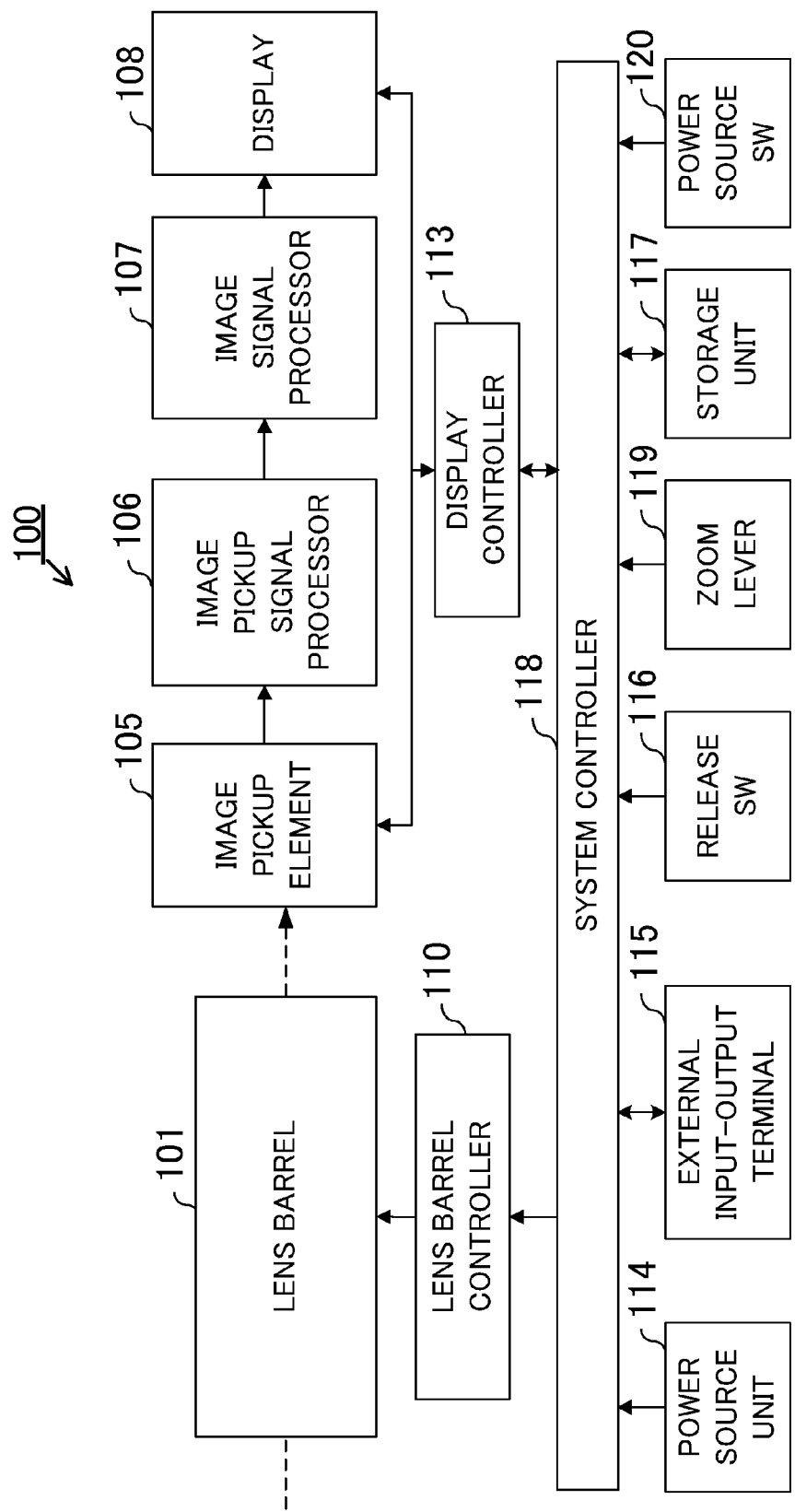
FIG. 1 is a block diagram of an image pickup apparatus in the present embodiment.

Exemplary embodiments of the present invention will be described below with reference to the accompanied drawings. In each of the drawings, the same elements will be denoted by the same reference numerals and the duplicate descriptions thereof will be omitted.

First of all, a schematic configuration of an image pickup apparatus in the present embodiment will be described. FIG. 1 is a block diagram of an image pickup apparatus 100 in the present embodiment. In the image pickup apparatus 100, reference numeral 101 denotes a lens barrel, which is configured by including a lens unit such as a focus lens and a zoom lens. Reference numeral 110 denotes a lens barrel controller (a controller), which performs a drive control of the lens barrel 101 based on an instruction from a system controller 118. Reference numeral 105 denotes an image pickup element, which converts an optical image passing through each lens unit into an electric signal. Reference numeral 106 denotes an image pickup signal processor, which performs a conversion processing of the electric signal outputted from the image pickup element 105 into an image signal. Reference numeral 107 denotes an image signal processor, which processes the image signal outputted from the image pickup signal processor 106 in accordance with an application. Reference numeral 108 denotes a display, which displays an image based on a signal outputted from the image signal processor 107 as necessary. Reference numeral 113 denotes a display controller, which controls the operation and the display of the image pickup element 105 and the display 108. Reference numeral 118 denotes a system controller that controls a whole of the system of the image pickup apparatus 100, which is configured by including a microcomputer (a CPU).

Reference numeral 120 denotes a power source SW. Reference numeral 114 denotes a power source unit, which supplies a power to an entire system in accordance with the application when the power source SW 120 is pushed. Reference numeral 115 denotes an external input-output terminal, which inputs and outputs a communication signal and an image signal between the image pickup apparatus and an external device. Reference numeral 116 denotes a release SW. Reference numeral 119 denotes a zoom lever that instructs a focal length in a zoom operation. Reference numeral 117 denotes a storage unit, which is configured by including a ROM, a RAM, and the like. In the ROM of the storage unit 117, a program that is used for the control by the system controller 118 or unnecessary data that does not need to be rewritten is stored. In the RAM of the storage unit 117, various kinds of data such as data used for the program or image information are stored.

Next, an operation of the image pickup apparatus 100 including the above configuration will be described. The release SW 116 is configured so that a first switch (hereinafter, referred to as a "SW1") and a second switch (hereinafter, referred to as a "SW2") are turned on in order in accordance with a push amount. The SW1 is turned on when the release SW 116 is pushed by half, and the SW2 is turned on when the release SW 116 is pushed entirely. When the SW1 of the release SW 116 is turned on, the lens barrel controller 110 drives the focus lens to perform an in-focus adjustment and also drives a stop to be set to an appropriate exposure amount. Furthermore, when the SW2 is turned on, the system controller 118 stores image data obtained from the optical image exposed on the image pickup element 105 in the storage unit 117. When the zoom lever 119 instructs the focal length adjustment, the lens barrel controller 110 receiving the instruction via the system controller 118 drives the zoom lens to move it to the instructed zoom position. The system controller 118 also drives the focus lens based on image information sent from the image pickup element 105 and processed in the image pickup signal processor 106 and the image signal processor 107 to perform a focus adjustment.

Figure 2:
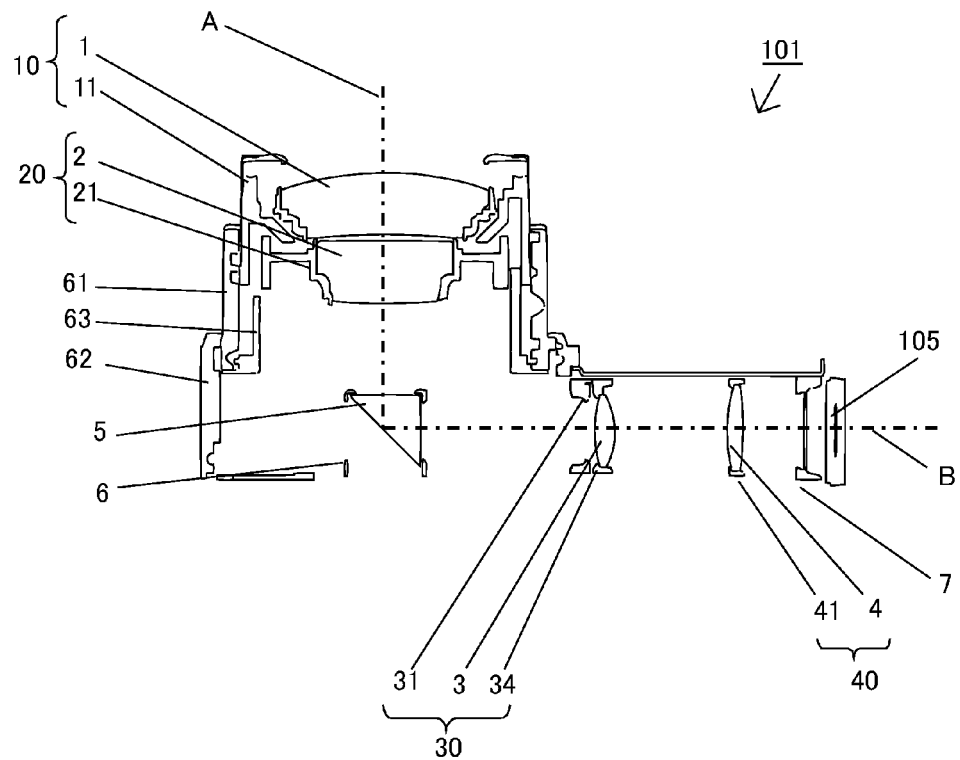
FIG. 2 is a cross-sectional diagram of a main part of a lens barrel at a wide-angle position (in a WIDE state) in the present embodiment.

Next, the configuration of the lens barrel 101 in the present embodiment will be described. FIG. 2 is a cross-sectional diagram of a main part when the lens barrel 101 including a bending optical system is at a wide angle position (a WIDE state). In FIG. 2, reference numeral 1 denotes a first unit lens, which is held by a first unit lens holder 11. The first unit lens 1 and the first unit lens holder 11 constitute a lens unit 10 (a first lens unit). Reference numeral 2 denotes a second unit lens, which is assembled in a second unit lens holder 21. The second unit lens 2 and the second unit lens holder 21 constitute a lens unit 20 (a first lens unit). The lens units 10 and 20 as a first lens unit are driven by a first drive unit as described below to perform a magnification-varying operation. Reference numeral 5 denotes a prism (a reflective optical element) that has a function of bending an optical axis A (an imaging optical axis) from an object by 90 degrees, which introduces a light incident in a direction of the optical axis A to an optical axis B orthogonal to the optical axis A (at an angle of around 90 degrees). The prism 5 is held by a prism holding member 6 so as to be movable back and forth along the optical axis B.

A shutter 31 that controls an imaging light amount is fixed on a third unit lens holder 34, and a third unit lens 3 is held by the third unit lens holder 34 behind the shutter 31. The third unit lens 3 and the third unit lens holder 34 constitute a lens unit 30 (a second lens unit), and the lens unit 30 is moved back and forth along the optical axis B by a second drive unit described below to perform the magnification-varying operation. Reference numeral 4 denotes a fourth unit lens, which is held by a fourth unit lens holder 41. The fourth unit lens 4 and the fourth unit lens holder 41 constitute a lens unit 40 (a second lens unit). The lens unit 40 is moved back and forth along the optical axis B by a drive source such as a stepping motor to perform the magnification-varying operation and the in-focus operation. Reference numeral 7 denotes an optical filter that is attached to a front surface of the image pickup element 105 and that has a low-pass filter function of cutting a light having a high spatial frequency and a function of cutting an infrared light. The lens barrel 101 also includes a fixed cylinder 62, a cam cylinder 61, and a linear guide cylinder 63.

Figure 3:
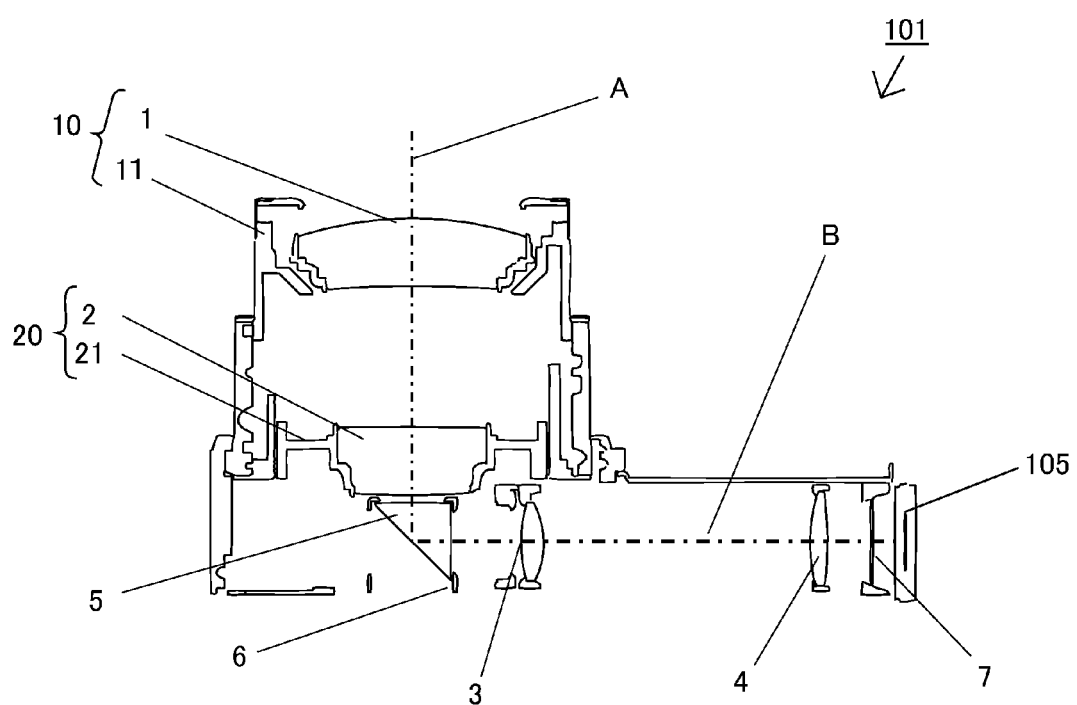
FIG. 3 is a cross-sectional diagram of a main part of the lens barrel at a telephoto position (in a TELE state) in the present embodiment.

FIG. 3 is a cross-sectional diagram of a main part when the lens barrel in the present embodiment is at a telephoto position (a TELE state). Relative to the WIDE state illustrated in FIG. 2, the lens units 10 and 20 are driven backward along the optical axis A by an M1 motor 510 described below (a first drive unit), and are positioned in a direction closer to the prism 5. The lens unit 30 is driven along the optical axis B by an M3 motor 512 described below (a second drive unit).

The lens barrel 101 as described above constitutes an imaging optical system, and an object image is imaged on the image pickup element 105 to convert a shot image into an electric signal to obtain an electrophotography. The prism 5 is one example as a reflective optical element for bending the light, and the present embodiment is not limited to this and for example a mirror may also be used. The reflective optical element may also be disposed between the lens unit 10 and the lens unit 20.

Figure 5:
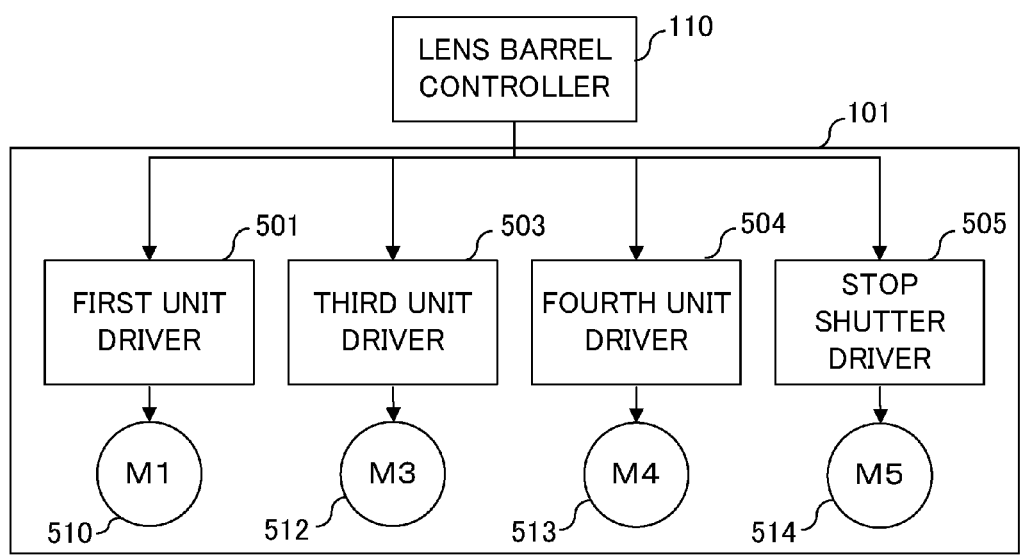
FIG. 5 is a block diagram of the lens barrel and a lens barrel controller in the present embodiment.

Next, referring to FIG. 5, motors that drive respective lens units will be described. FIG. 5 is a block diagram of the lens barrel 101 and the lens barrel controller 110.

Reference numeral 510 denotes an M1 motor that drives the lens units 10 and 20. Reference numeral 512 denotes an M3 motor that drives the lens unit 30. Reference numeral 513 denotes an M4 motor that drives the lens unit 40. Reference numeral 514 denotes an M5 motor that drives a stop shutter.

Reference numeral 501 denotes a first unit driver that drives the M1 motor 510. The first unit driver 501 is configured by a circuit such as an H-bridge that is used for driving the M1 motor 510. The first unit driver 501 is capable of driving the M1 motor 510 to an arbitrary position based on an instruction from the lens barrel controller 110. For example, when the M1 motor 510 is a stepping motor, the first unit driver 501 outputs a pulse to the M1 motor 510 for moving the M1 motor 510 to a position in accordance with the instruction of the lens barrel controller 110. As described below, the lens units 10 and 20 are driven by the same M1 motor 510.

Reference numeral 503 denotes a third unit driver that drives the M3 motor 512. The third unit driver 503 is configured by a circuit such as an H-bridge that is used for driving the M3 motor 512. The third unit driver 503 is capable of driving the M3 motor 512 to an arbitrary position based on an instruction from the lens barrel controller 110. For example, when the M3 motor 512 is a stepping motor, the third unit driver 503 outputs a pulse to the M3 motor 512 for moving the M3 motor 512 to a position in accordance with the instruction of the lens barrel controller 110.

Reference numeral 504 denotes a fourth unit driver that drives the M4 motor 513. The fourth unit driver 504 is configured by a circuit such as an H-bridge that is used for driving the M4 motor 513. The fourth unit driver 504 is capable of driving the M4 motor 513 to an arbitrary position based on an instruction from the lens barrel controller 110. For example, when the M4 motor 513 is a stepping motor, the fourth unit driver 504 outputs a pulse to the M4 motor 513 for moving the M4 motor 513 to a position in accordance with the instruction of the lens barrel controller 110.

Reference numeral 505 denotes a stop shutter driver that drives the M5 motor 514. The stop shutter driver 505 is configured by a circuit such as an H-bridge that is used for driving the M5 motor 514. The stop shutter driver 505 is capable of driving the M5 motor 514 to an arbitrary position based on an instruction from the lens barrel controller 110. For example, when the M5 motor 514 is a stepping motor, the stop shutter driver 505 outputs a pulse to the M5 motor 514 for moving the M5 motor 514 to a position in accordance with the instruction of the lens barrel controller 110.

The M1 motor 510, the M3 motor 512, the M4 motor 513, and the M5 motor 514 are coupled to the lens barrel controller 110 via the first unit driver 501, the third unit driver 503, the fourth unit driver 504, and the stop shutter driver 505, respectively.

Figure 6:
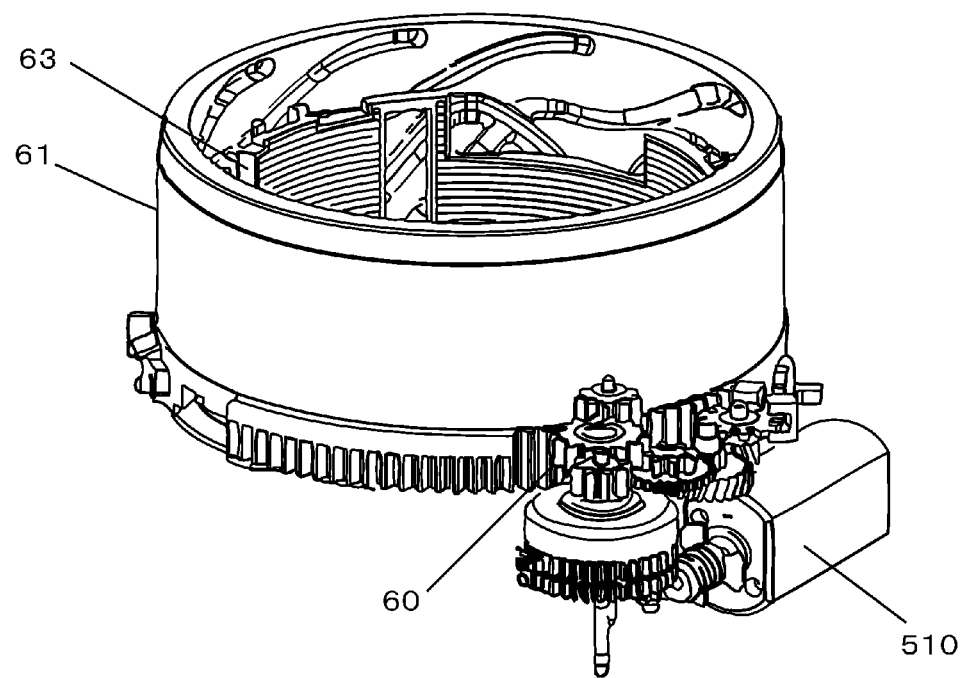
FIG. 6 is a perspective view of a cam cylinder and its peripheral region in the present embodiment.

Next, referring to FIG. 6, motions of the lens units 10 and 20 will be described. FIG. 6 is a perspective view of a cam cylinder and its peripheral region in the present embodiment. A cam groove is formed on the fixed cylinder 62 (see FIG. 2) at an inner surface side, and a cam pin that is fixed on or is molded integrally with the cam cylinder 61 engages slidably with respect to the cam groove. A gear that engages with a drive gear 60 is formed on the cam cylinder 61, and an output of the M1 motor 510 is received by the drive gear 60 to perform a rotary drive of the cam cylinder 61. In this case, in accordance with the function of the cam groove, the cam cylinder 61 moves back and forth along the optical axis A. The linear guide cylinder 63 is disposed so as to be rotatable and movable back and forth in the optical axis A integrally with the cam cylinder 61 in an internal diameter portion of the cam cylinder 61. A first unit cam groove and a second unit cam groove are formed in the internal diameter portion of the cam cylinder 61.

The first unit lens holder 11 that holds the lens unit 10 is held between the internal diameter portion of the cam cylinder 61 and an outside diameter of the linear guide cylinder 63. The cam pin that is fixed on or is molded integrally with the first unit lens holder 11 slidably engages with the first unit cam groove. A concave portion (not shown) in a direction of the optical axis A that is provided at an outer circumferential portion slidably engages with an engagement portion formed in an inner circumferential portion of the first unit lens holder 11 to restrict the motion in a rotational direction of the linear guide cylinder 63. The second unit lens holder 21 is disposed inside the linear guide cylinder 63. Similarly to the first unit lens holder 11, a cam pin that is provided on the second unit lens holder 21 slidably engages with the second unit cam groove of the cam cylinder 61. A through groove in the optical axis direction that is provided on the linear guide cylinder 63 slidably engages an engagement portion that is provided at a root of the cam pin of the second unit lens holder 21 to restrict the rotation.

When the cam cylinder 61 starts to rotate, the first unit lens holder 11 moves back and forth along the optical axis relative to the cam cylinder 61 by the engagement function of the cam groove of the cam cylinder 61 and the cam pin of the first unit lens holder 11 and the function of the concave shape of the linear guide cylinder 63 and the convex shape of the first unit lens holder 11. Therefore, when the cam cylinder 61 moves back and forth along the optical axis A relative to the fixed cylinder 62, the first unit lens holder 11 further moves back and forth relative to the can cylinder 61. The second unit lens holder 21 also moves back and forth by the same function.

Figure 4:
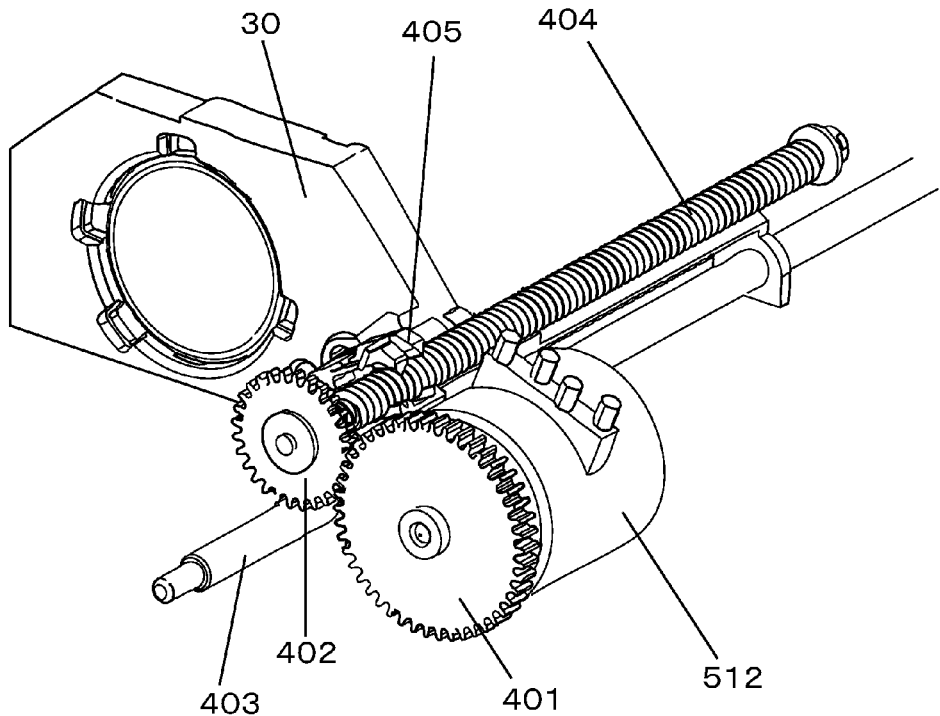
FIG. 4 is a perspective view of a lens unit, a motor, and their peripheral region in the present embodiment.

Next, referring to FIG. 4, the motion of the lens unit 30 will be described. FIG. 4 is a perspective view of the lens unit 30, the M3 motor 512, and their peripheral region. A drive gear 401 is attached to a shaft of the M3 motor 512 that drives the lens unit 30. The drive gear 401 engages with a gear 402 attached to a lead screw 404, and the lead screw 404 is rotatable by the M3 motor 512.

The lens unit 30 is held by a holding member 403 and also a rack 405 is attached to the lens unit 30. The rack 405 engages with the lead screw 404. Such a configuration can drive the lens unit 30 in the optical axis direction when the M3 motor 512 is rotated. However, when the drive gear 401 engages with the gear 402 in the drive, a backlash or a noise in an inverse motion caused by an engagement backlash may be a problem.

Figure 7A:
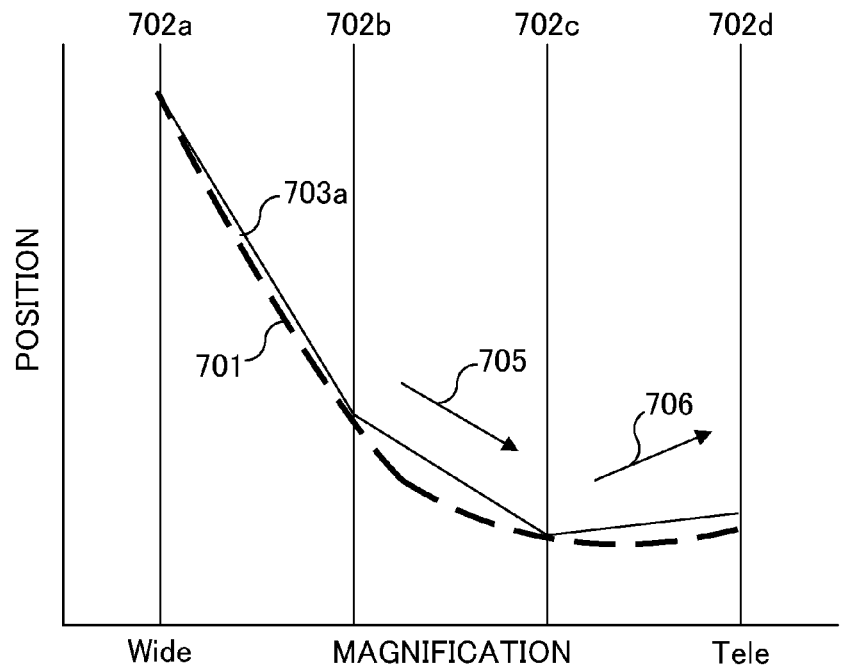
FIGS. 7A and 7B are graphs that illustrate a relationship between a position of the lens unit and a magnification in the present embodiment.
Figure 7B:
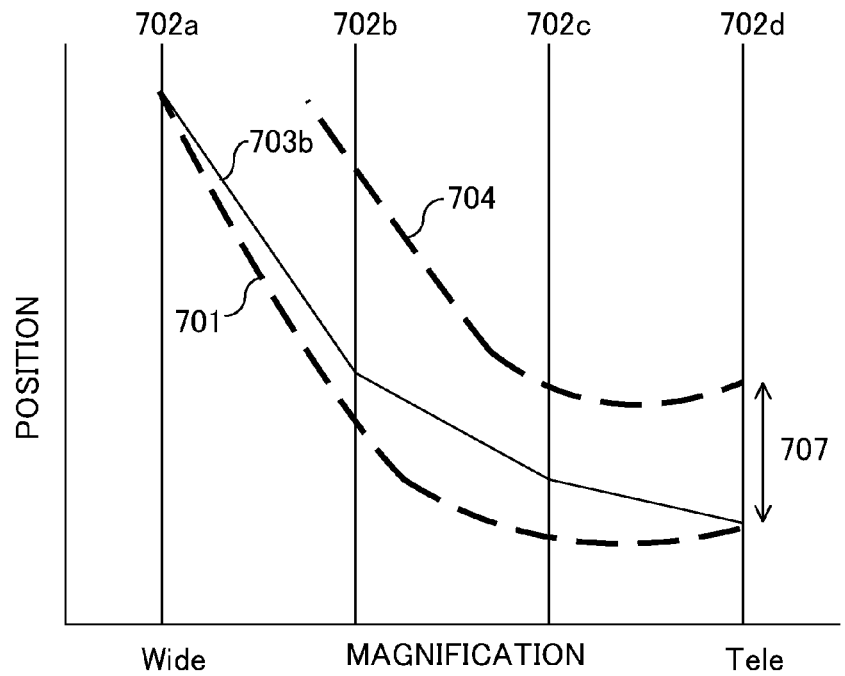

Next, referring to FIGS. 7A and 7B, the motion of the lens unit 30 in the zoom operation (the magnification-varying operation) will be described. FIGS. 7A and 7B are graphs that illustrate a relationship between a position of the lens unit 30 and a magnification in the zoom operation. FIG. 7A illustrates a case where the present embodiment is not applied, and FIG. 7B illustrates a case where the present embodiment is applied. In each of FIGS. 7A and 7B, a lateral axis indicates the zoom magnification and a vertical axis indicates the position of the lens unit 30.

In order to obtain a desired zoom magnification between the wide-angle position (Wide) and the telephoto position (Tele), the lens units 10, 20, and 30 need to be disposed so as to be in a predetermined position relation. However, the lens unit 20 is, as described above, driven by the M1 motor 510 as is the case of the lens unit 10, and the positions of the lens units 10 and 20 are determined so as to be in a predetermined position relation by the cam groove of the cam cylinder 61. Accordingly, in order to obtain the desired zoom magnification between the wide-angle position (Wide) and the telephoto position (Tele), the lens units 10 and 30 need to be set to be in a predetermined position relation. In order to set the lens units 10 and 30 to be in the predetermined position relation, the lens unit 30 only has to be driven to a position indicated by a dashed line 701 between the wide-angle position (Wide) and the telephoto position (Tele). In other words, the dashed line 701 indicates a position of the lens unit 30 to obtain the desired zoom magnification between the wide-angle position (Wide) and the telephoto position (Tele). In a real apparatus, since the lens units 10 and 30 are simultaneously driven to change the zoom magnification, the position of the lens units 30 may be determined with reference to the position of the lens unit 10 between the wide-angle position (Wide) and the telephoto position (Tele).

In FIGS. 7A and 7B, each of reference numerals 702a, 702b, 702c, and 702d indicates control timing. In order to be set to the desired zoom magnification, the lens barrel controller 110 only has to drive the lens unit 30 along the dashed line 701. Actually, the lens barrel controller 110 performs a control so that the drive position and the drive velocity of the M3 motor 512 are determined at predetermined intervals (a predetermined control cycle). Each of the control timings 702a, 702b, 702c, and 702d indicates a control timing per control cycle. For example, when the lens unit 30 is driven in a direction from the wide-angle position (Wide) to the telephoto position (Tele) at the current control timing 702a, target position and velocity at the subsequent control timing 702b that is set at the control timing 702a is obtained by the following expression.

Target position=Position of the lens unit corresponding to the zoom magnification at the control timing 702b

Velocity=(Position of the control timing 702b−Position of the control timing 702a)/Control cycle Thus, although the drive of the lens unit 30 is ideally the dashed line 701, it actually follows a trajectory 703a in FIG. 7A. In this case, a drive direction of the lens unit 30 is changed from a downward direction (a first direction) indicated by an arrow 705 to an upward direction (a second direction) indicated by an arrow 706 at the control timing 702c that is an inflection point of the dashed line 701 (FIG. 7A). Thus, when the drive direction of the lens unit 30 is inversed, the backlash or the retroflex of the gear may be generated. Since the dashed line 701 is determined in accordance with the optical design, it is difficult to eliminate the inflection point.

In the present embodiment, the target position of the lens unit 30 is shifted in a predetermined permissible range to eliminate the inversion motion of the lens unit 30 to suppress the generation of the backlash and the retroflex. In FIG. 7B, reference numeral 704 denotes a boundary that defines the predetermined permissible range of the target position of the lens unit 30. If the lens unit 30 is positioned in a predetermined range (a predetermined permissible range 707) between the dashed line 701 and the boundary 704, a desired zoom magnification can be ensured. In FIG. 7B, reference numeral 703b denotes a trajectory that is obtained when the present embodiment is applied. The trajectory 703b is a trajectory where the target position of the lens unit 30 is shifted from the trajectory 703a in the predetermined permissible range 707 to eliminate the inversion motion of the lens unit 30. The trajectory 703b indicates that lens unit 30 is controlled so as to be only moved in the downward direction (the first direction).

The predetermined permissible range 707 may be set in a tolerance if the tolerance of the zoom magnification is determined. When the focus is emphasized more than the magnification, the focus position may be shifted to be set in the predetermined range in a permissible range of the focus of the lens unit 30. The permissible range of the focus can be obtained by an optical design using a known method. The predetermined permissible range 707 may also be determined considering both the tolerance of the zoom magnification and the permissible range of the focus.

Figure 8:
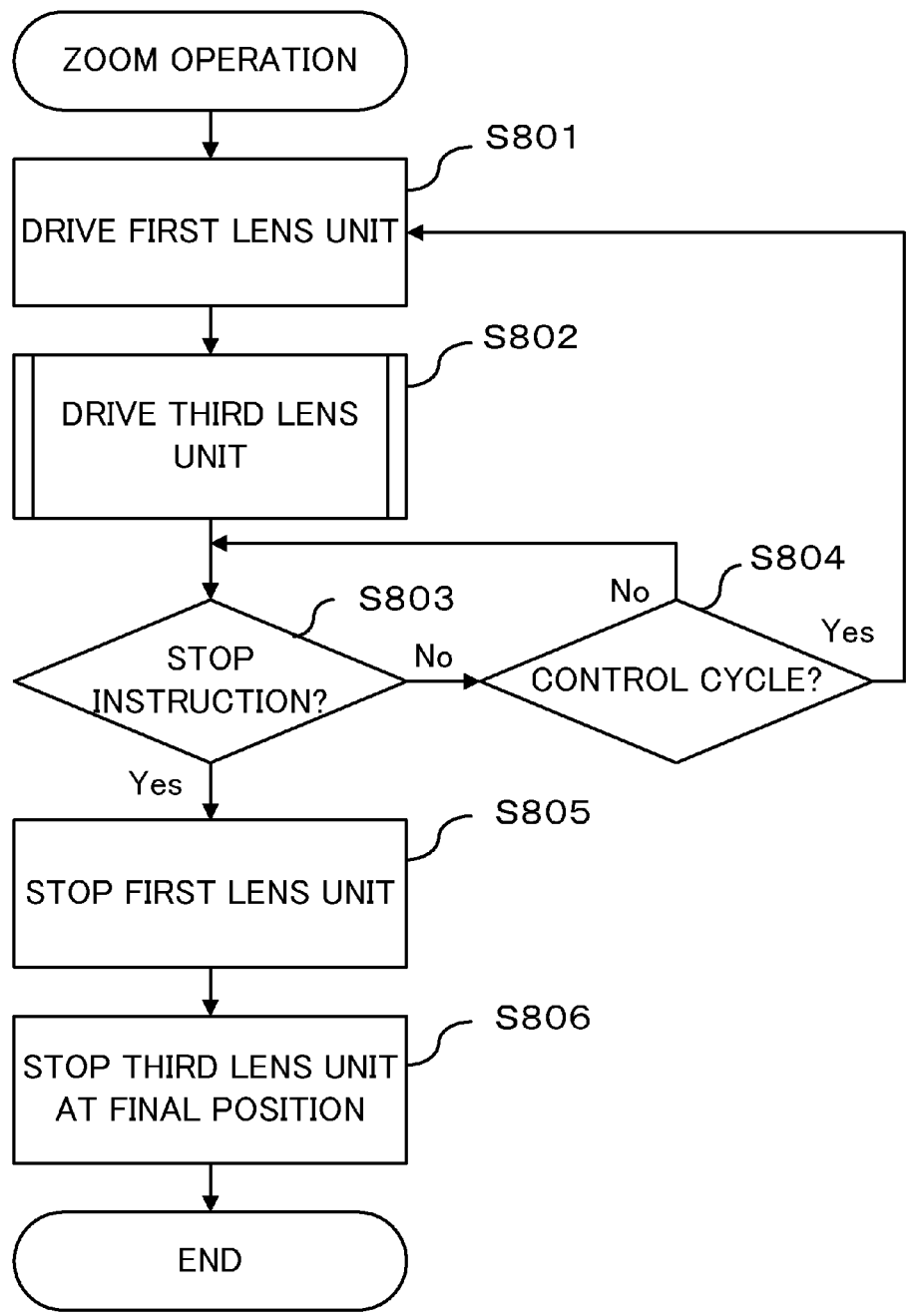
FIG. 8 is a flowchart of a zoom drive in the present embodiment.
Figure 9:
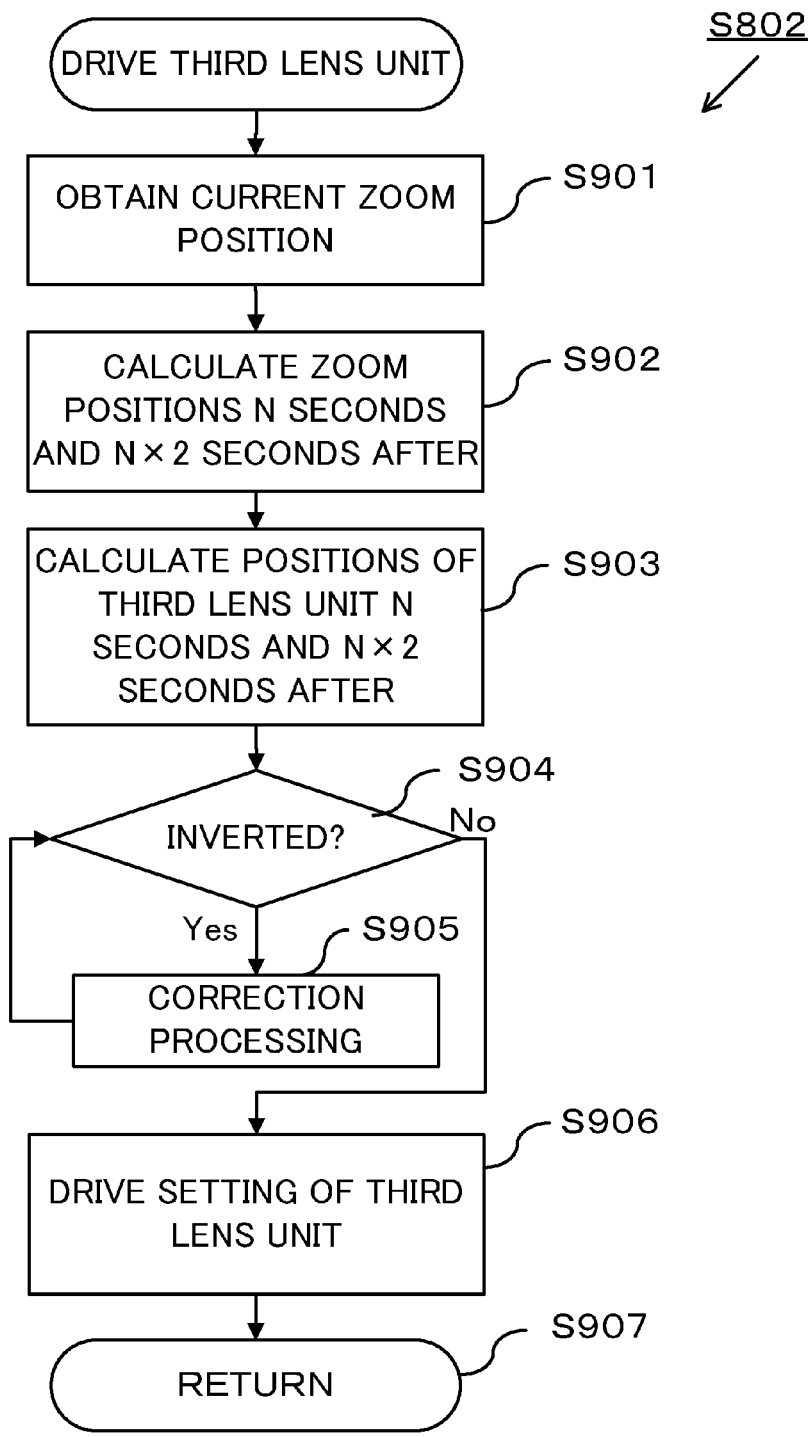
FIG. 9 is a flowchart of a drive of the lens unit in the present embodiment.

Next, referring to FIGS. 8 and 9, the zoom operation in the present embodiment will be described. FIG. 8 is a flowchart of the zoom drive. FIG. 9 is a flowchart of the drive of the lens unit 30. The flows illustrated in FIGS. 8 and 9 are performed based on an instruction of the lens barrel controller 110. When a user operates a zoom lever 119, the system controller 118 instructs the lens barrel controller 110 so as to perform the zoom operation. In the zoom operation illustrated in FIG. 8, first of all, in Step S801, the first unit driver 501 drives the lens unit 10 using the M1 motor 510. Subsequently, in Step S802, the third unit driver 503 drives the lens unit 30 using the M3 motor 512. The details will be described below.

After the lens unit 30 is driven, in Step S803, the lens barrel controller 110 determines whether or not a stop instruction is issued for the fact that the zoom lever 119 is moved to the stop position or the like. When the stop instruction is not issued, i.e. the result of the determination in Step S803 is "No", the flow proceeds to Step S804 and the lens barrel controller 110 determines whether or not a time of a predetermined control cycle has been passed. When the predetermined control cycle has not been passed, i.e. the result of the determination in Step S804 is "No", the flow returns to Step S803 and the determination of the stop instruction is performed again. This is performed in order to improve the response of receiving the stop instruction. On the other hand, when the time of the predetermined control cycle has been passed in Step S804, i.e. the result of the determination in Step S804 is "Yes", the flow returns to Step S801 and the drive of the lens unit 10, the drive of the lens unit 30, and the determination of the stop instruction are repeated.

When the stop instruction is issued in Step S803, i.e. the result of the determination in Step S803 is "Yes", the first unit driver 501 stops the lens unit 10 in Step S805. Furthermore, in Step S806, the third unit driver 503 stops the lens unit 30 in accordance with the final stop position of the lens unit 10. As described above, the zoom operation is finished.

FIG. 9 is a sub-routine process of the drive of the lens unit 30 (Step S802 in FIG. 8). When the third unit driver 503 drives the lens unit 30, first of all, in Step S901, the current zoom position (at a first time) is obtained. The current zoom position can be determined in accordance with the position of the lens unit 10 between the wide-angle position (Wide) and the telephoto position (Tele). The current zoom position can also be obtained by the same process using data obtained when treating the lateral axis of the graph illustrated in FIG. 7B as the lens unit 10.

Next, in Step S902, using the current zoom position obtained in Step S901 and the control cycle (N seconds), the subsequent zoom position (at a second time) of the control cycle (the zoom position after the control cycle from the first time (N seconds after the first time)) is calculated. Furthermore, the subsequent zoom position (at a third time, i.e. a time after the second time) of the control cycle (the zoom position N×2 seconds after the first time, i.e. the zoom position after the control cycle from the second time (N seconds after the second time)) is calculated. As described above, since the zoom position may be determined in accordance with the position of the lens unit 10, the zoom position can be obtained using the velocity of the lens unit 10 as described below.

Subsequent zoom position of the control cycle=Current zoom position+Velocity of the lens unit×Control cycle Zoom position after the subsequent zoom position of the control cycle=Current zoom position+Velocity of the lens unit×Control cycle×2

Subsequently, in Step S903, using corresponding data of the zoom position and the position of the lens unit 30 as illustrated in FIG. 7B, the subsequent position of the lens unit 30 (at the second time) of the control cycle and the positions after the subsequent position of the lens unit 30 (at the third time, i.e. the time after the second time) of the control cycle are calculated.

Next, in Step S904, the lens barrel controller 110 determines whether or not the inversion motion of the lens unit 30 is performed. In other words, it determines whether or not the following relationship is met.

Current position of the lens unit>Subsequent position of the lens unit>Position after the subsequent position of the lens unit The direction of the inequality sign is inversed in accordance with a traveling direction of the zooming.

When the inversion operation of the lens unit 30 is performed in Step S904, i.e. the result of the determination in Step S904 is "Yes", the flow proceeds to Step S905 and the lens barrel controller 110 performs a correction processing. In this correction processing, first of all, the lens barrel controller 110 calculates a correction amount. For example, when the current position of the lens unit and the subsequent position of the lens unit are inversed, the correction amount is calculated as described below.

Correction amount=Current position of the lens unit−Subsequent position of the lens unit After the lens barrel controller 110 calculates the correction amount, it adds the correction amount to the subsequent position of the lens unit calculated in Step S903. In a case where the position is over the predetermined permissible range 707 illustrated in FIG. 7B when the correction amount is added to the subsequent position of the lens unit, the boundary 704 is set as a limit. In other words, when the position is over the predetermined permissible range 707, a value on the boundary 704 is used as the subsequent position of the lens unit. Since the entire magnitude relation is also changed when the correction processing is performed in Step S905, the flow returns to Step S904 and whether or not the inversion operation of the lens unit is performed is determined again.

When the lens barrel controller 110 determines that the inversion operation of the lens unit is not performed in Step S904, i.e. the result of the determination in Step S904 is "No", the flow proceeds to Step S906. In Step S906, the drive setting of the third unit lens is performed using the position calculated in Step S903 or using the corrected value when the correction processing has been performed as a drive target of the lens unit 30. Then, the sub-routine of the drive of the lens unit 30 is finished (Step S907).

Thus, the lens barrel controller 110 controls the M1 motor (the first drive unit) and the M3 motor 512 (the second drive unit) so as to drive the lens unit 30 (the second lens unit) with reference to the positions of the lens units 10 and 20 (the first lens unit) in performing the magnification-varying operation. In this case, the lens barrel controller 110 controls the lens unit 30 so as to be moved only in the first direction. When the lens barrel controller 110 determines that the moving direction of the lens unit 30 needs to be changed from the first direction to the second direction in order to obtained a predetermined magnification in performing the magnification-varying operation, it performs a correction processing to maintain the moving direction of the lens unit 30 in the first direction. The lens barrel controller 110 can control the M3 motor 512 so as to drive the lens unit 30 while shifting the magnification in a predetermined range. The lens barrel controller 110 may also control the M3 motor 512 so as to drive the lens unit 30 while shifting the focus position in a predetermined range.

According to the present embodiment, in an image pickup apparatus that controls a plurality of lens units using motors different from each other and a drive control method of the lens, the image pickup apparatus and the drive control method of the lens that are capable of suppressing the generation of the noise in performing the magnification-varying operation can be provided. Therefore, the image pickup apparatus and the drive control method of the lens that are capable of performing the lens drive suitable for a moving image can be provided. In the present embodiment, although the case where the lens unit 30 is applied as the second lens unit is described, the present embodiment is also applied to the lens unit 40 similarly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-176912, filed on Aug. 6, 2010, which is hereby incorporated by reference herein in its entirety.

What is claimed is:

1. An image pickup apparatus comprising:
a first drive unit;
a first lens unit configured to be driven by the first drive unit to perform a magnification-varying operation;
a second drive unit;
a second lens unit configured to be driven by the second drive unit; and
a controller configured to control the first drive unit and the second drive unit so as to drive the second lens unit with reference to a position of the first lens unit in performing the magnification-varying operation,
wherein the controller controls the second lens unit so as to move only in a first direction in performing the magnification-varying operation based on a first position and a second position, wherein the first position is a position of the second lens unit corresponding to a position of the first lens unit at a first time and the second position is a position of the second lens unit corresponding to a position of the first lens unit at a second time, wherein the first time and the second time are different times after a present time.

2. The image pickup apparatus according to claim 1, wherein the controller performs a correction processing to maintain a moving direction of the second lens unit in the first direction when determining that the moving direction of the second lens unit needs to be inversed from the first direction to a second direction to obtain a predetermined magnification in performing the magnification-varying operation.

3. The image pickup apparatus according to claim 2, wherein the controller controls the second drive unit so as to shift the magnification in a predetermined range to drive the second lens unit.

4. The image pickup apparatus according to claim 2, wherein the controller controls the second drive unit so as to shift a focus position in a predetermined range to drive the second lens unit.

5. The image pickup apparatus according to claim 1, wherein the controller calculates the first position and the second position of the second lens unit based on the positions of the first lens unit at the first and second times after the present time.

6. A drive control method of a lens that drives a first lens unit using a first drive unit and that drives a second lens unit using a second drive unit to perform a magnification-varying operation, the drive control method comprising the steps of:
calculating a first position and a second position of the second lens unit based on positions of the first lens unit at different times after a present time; and
driving the second lens unit only in a first direction in performing the magnification-varying operation based on the first and second positions.

* * * * *